United States Patent [19]

Knöchel et al.

[11] Patent Number: 4,519,996
[45] Date of Patent: May 28, 1985

[54] METHOD FOR ENRICHING AND SEPARATING HEAVY HYDROGEN ISOTOPES FROM SUBSTANCE STREAMS CONTAINING SUCH ISOTOPES BY MEANS OF ISOTOPE EXCHANGE

[75] Inventors: Arndt Knöchel; Ingo Eggers; Bernd Klatte, all of Hamburg; Rolf-Dieter Wilken, Wentorf, all of Fed. Rep. of Germany

[73] Assignee: Kernforschungszentrum Karlsruhe GmbH, Fed. Rep. of Germany

[21] Appl. No.: 461,171

[22] Filed: Jan. 26, 1983

[30] Foreign Application Priority Data

Jan. 28, 1982 [DE] Fed. Rep. of Germany ....... 3202776

[51] Int. Cl.³ .............................................. C01B 5/00
[52] U.S. Cl. ................. 423/249; 423/648 A; 423/580 H
[58] Field of Search ............... 423/648 A, 249, 580 H

[56] References Cited

U.S. PATENT DOCUMENTS

| 2,780,526 | 2/1957 | Fleck | 423/648 A |
| 3,214,486 | 10/1965 | Doyle et al. | 423/249 |
| 3,464,789 | 9/1969 | Courvosier et al. | 423/648 A |
| 3,995,017 | 11/1976 | Holtslander et al. | 423/648 A |

FOREIGN PATENT DOCUMENTS

| A10023530 | 2/1981 | European Pat. Off. | |
| 2728576 | 2/1981 | Fed. Rep. of Germany | |
| 81899 | 7/1978 | Japan | 423/648 A |

OTHER PUBLICATIONS

Ralph G. Pearson, "Hard and Soft Acids and Bases", Journal of the American Chemical Society, vol. 85, No. 22, Nov. 20th, 1963, pp. 3533–3539.
Edwin Weber et al, "Crown-Type Compounds-An Introductory Overview"; from Topics in Current Chemistry, vol. 98, Springer, Berlin, 1981; pp. 1–16.

*Primary Examiner*—John Doll
*Assistant Examiner*—Wayne A. Langel
*Attorney, Agent, or Firm*—Sughrue, Mion, Zinn, Macpeak, and Seas

[57] ABSTRACT

A process for enriching and separating heavy hydrogen isotopes having a heavy hydrogen cation (deuterium and/or tritium) from substance streams containing them, wherein the respectively present hydrogen isotopes are exchanged in chemical equilibria. A protic, acid solution containing deuterium and/or tritium is brought into contact with a value material from the group of open-chained polyethers or aminopolyethers, macro-monocyclic or macro-polycyclic polyethers, macro-monocyclic or macro-polycyclic amino polyethers, and mixtures of these values, in their free or proton salt form to form a reaction product of the heavy hydrogen cation with the value or value salt and bring about enrichment of deuterium and/or tritium in the reaction product. The reaction product containing the value or value salt is separated from the solution. The separated reaction product is treated to release the hydrogen isotope(s) to be enriched in the form of deuterium oxide (HDO) and/or tritium oxide (HTO) by regenerating the value or its salt, respectively. The regenerated value is returned for reuse.

48 Claims, 2 Drawing Figures

METHOD FOR ENRICHING AND SEPARATING HEAVY HYDROGEN ISOTOPES FROM SUBSTANCE STREAMS CONTAINING SUCH ISOTOPES BY MEANS OF ISOTOPE EXCHANGE

BACKGROUND OF THE INVENTION

The present invention relates to a method for enriching and separating heavy hydrogen isotopes, namely deuterium and/or tritium, from substance streams containing such isotopes, wherein the respectively present hydrogen isotopes are exchanged in chemical equlibria.

One method for enriching hydrogen isotopes by isotope exchange is disclosed in DE-AS No. 2,728,576, wherein the isotope exchange between liquid water and gaseous hydrogen is effected in the presence of a catalyst mass comprising a suitable carrier, at least one metal from Group VIII of the Periodic Table and a hydrophobic polymer material which is permeable to water vapor and hydrogen gas. Initially, there occurs a catalytic isotope exchange between hydrogen gas and water vapor, and thereafter there occurs, in a noncatalytic process stage, an isotope exchange between water vapor and liquid water. This process employs a catalyst mass in which additional packing components are dispersed and can be used for the enrichment of deuterium, and also of tritium.

The exchange process described in De-AS No. 2,728,576 is connected with high expenditures for controlling it as well as for the size of the plant required to implement it and for the energy consumed by it. It operates with a stream of hydrogen and cannot be simply transferred to processes which are to be integrated, for example, into a process like the Purex process for reprocessing of irradiated nuclear fuels.

A process for purifying the product solutions of tritium obtained during reprocessing of irradiated nuclear fuels according to the Purex process is disclosed in published European Patent Application No. 0,023,530. This purification process operates with a plurality of series connected extraction cycles employing an organic solvent and is characterized in that a plurality of intermediate purification cycles of the aqueous phase are provided for the extraction of tritium. The recovery of uranium and/or plutonium during reprocessing of irradiated nuclear fuels is effected in several extraction and re-extraction cycles in which aqueous waste solutions are obtained which contain tritium in the form of HTO. An intermediate purification cycle of the aqueous phase for the purpose of extracting tritium begins in the second extraction stage of the actinides and leads back to the first re-extraction stage. The aqueous phase is extracted in the second extraction stage and caused to evaporate.

From there, the concentrate containing HTO is removed and is extracted from the intermediate cycle. The distillate is then mixed with a freshly started solution containing the required chemicals, but not yet containing tritium, and is introduced into the first re-extraction stage so that the intermediate purification cycle is closed.

The tritium purification process described in European Patent Application No. 0,023,530 results in only a relatively low enrichment of HTO and requires a large amount of energy for the evaporation of the aqueous phase from the second extraction stage.

SUMMARY OF THE INVENTION

It is an object of the present invention to provide a process for enriching and separating heavy hydrogen isotopes (deuterium and/or tritium) from substance streams containing such isotopes, particularly from such streams obtained in processes for reprocessing irradiated nuclear fuels and/or breeder materials.

A further object of the present invention is to provide such a process which can be implemented in a simple manner and at relatively low expense for plant, energy and personnel and utilizes exchange equilibria.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve these objects and in accordance with its purpose, the present invention provides a process for enriching and separating heavy hydrogen isotopes having a heavy hydrogen cation (deuterium and/or tritium) from substance streams containing them, wherein the respectively present hydrogen isotopes are exchanged in chemical equilibria, comprising:

(a) bringing a protic*, acid solution containing deuterium and/or tritium into contact with a value material from the group of open-chained polyethers or aminopolyethers, macro-monocyclic or macro-polycyclic polyethers, macro-monocyclic or macro-polycyclic amino polyethers, and mixtures of these values, in their free or proton salt form to form a reaction product of the heavy hydrogen cation with the value or value salt and bring about enrichment of deuterium and/or tritium in the reaction product;

*protic means containing protons (b) separating the reaction product containing the value or value salt from the solution; and (c) releasing from the separated reaction product the hydrogen isotope(s) to be enriched in the form of deuterium oxide (HDO) and/or tritium oxide (HTO) by regenerating the value or its salt, respectively, and returning the value or its salts for reuse.

It is to be understood that both the foregoing general description and the following detailed description are exemplary and explanatory, but are not restrictive of the invention.

DETAILED DESCRIPTION OF THE INVENTION

In the process according to the present invention, heavy hydrogen isotopes are bound, by use of chemical exchange processes, preferably in the onium or ammonium salt of one of the above-listed values, due to isotopic effects. The onium or ammonium salt of the values is referred to herein as the proton salt form of the value. The onium or ammonium salt of the value distributes itself to two phases (aqueous and liquid or solid organic phase respectively) which do not mix with one another or mix only very slightly.

Between the two phases, there then occurs an exchange of the cations of the hydrogen isotopes.

Under consideration of the steps (a), (b), (c), it is then possible to build up a countercurrent system in which there then occurs in each stage an isotope exchange between onium or ammonium salts of the value which are charged differently with hydrogen isotopes and which, due to the magnitude of the effects occurring in the individual stages, includes a comparatively small number of stages. Systems customarily employed in the chemical processing art are suitable for the realization of such a system, in the case of countercurrent extraction for liquid/liquid distribution, for example, mixer settlers or extraction columns.

In the practice of the present invention, in process step (a) the aqueous starting solution or feed solution, respectively, in which the hydrogen isotopes are present cationically or in the form of water, are brought into contact with the value or with its onium or ammonium salt.

The values to be employed can be a species or a mixture of open chained polyethers or aminopolyethers having a structure according to the general formula $$R_1O\text{-}(CH_2\text{---}CH_2\text{---}X)_n\text{---}CH_2\text{---}CH_2\text{---}OR_2 \quad (I)$$

where
 X=O, or NH;
 n=a number from 0 to 5; and
 $R_1$, $R_2$ independently=alkyl, aryl, or polymer.**)
**)alkyl: cyclohexyl, decyl polymer: polyvinyl, polystyrol-matrix aryl: phenyl, benzyl

The process of the present invention also can be performed by using as the value a species or a mixture of macrocyclic polyethers which have a structure according to the general formula (II)

where n=a number from 0 to 6;

R'=polymer, alkyl-, alkyl-O-, or alkyl—CH$_2$NH—.**)
**)alkyl: cyclohexyl, decyl polymer: polyvinyl, polystyrol-matrix The process according to the present invention can likewise be implemented successfully, if the value is a species or a mixture of macromonocyclic aminopolyethers having a structure according to the general formula wherein
 m, n independently=0, 1, or 2;
 $R_3$, $R_4$, $R_5$ independently=H, alkyl having 1 to 20 C atoms R'=—polymer, —alkyl, —O—alkyl, or —NH-CH$_2$-alkyl.**)
**)alkyl: cyclohexyl, decyl polymer: polyvinyl, polystyrol-matrix A further alternative for the process according to the present invention provides, that the value employed is a species or a mixture of macrobicyclic aminopolyethers having a structure according to the general formula where m, n independently=0, 1, or 2

R'=-polymer, —alkyl, —O—alkyl, or —NH—CH$_2$—alkyl.**)
**)alkyl: cyclohexyl, decyl polymer: polyvinyl, polystyrol-matrix

Finally, a species or a mixture of macropolycyclic aminopolyethers can also be used as the value(s).

As representatives for the group of the macropolycyclic aminopolyethers, three different types of these compounds are listed here.

or where X=O, NH or CH₂.

In process step (a), the value or value salt reacts as a Lewis base with the cationic hydrogen isotopes to form an onium or ammonium salt according to equation V.

(V)

where Do=donor=N or O; R-Do-R=abbreviation for every value mentioned before.

The bound hydrogen cations themselves are in quick exchange with the water bound isotopic (heavy) hydrogen atoms. The particularity of the values employed is that the hydrogen isotope which is caused to react enters into an interaction range with other donors and forms additional hydrogen bridge bonds with them, for example according to (VI)

Such bonds accomplish two things:
a polyfunctional bond system which reacts with particular sensitivity to the slightly different behavior of cationic hydrogen isotopes;
an at least partial shielding of the bound hydrogen cations against surrounding hydrate forming water molecules which "blur" the isotopy effect.

Therefore, in the reaction of cationic hydrogen isotopes with the value, there preferably occurs a bond of a heavy hydrogen isotope.

The results are particularly high thermodynamic isotopy effects, which can be described, for example in the exchange equilibrium $$[R-H]^+ + [H_2TO]^+ \rightleftharpoons [R-T]^+ + H_3O^+ \qquad (VII)$$

by the equilibrium constant (equilibrium isotopy effect) of the isotope exchange reaction.

Figure 1:
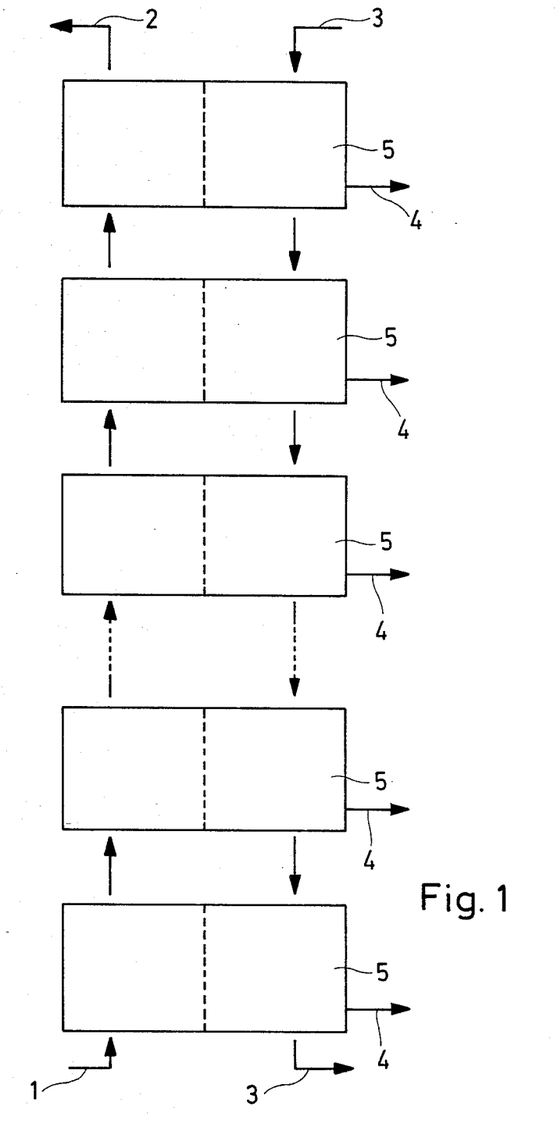
FIG. 1 is a schematic drawing illustrating a multistage system for isotope exchange in accordance with a preferred embodiment of the present invention.

A further advantage of the employed values is that, due to their great flexibility, they permit the setting of the isotope exchange equilibrium in times which permit the use of multistage systems such as those illustrated in FIG. 1.

In FIG. 1, there is shown a 5-stage system for countercurrent treatment in which isotope exchange equilibrium is achieved in each stage. In FIG. 1, reference numeral 1 represents water to be deriched. Reference numeral 2 represents deriched water containing a value salt and which can be subjected to a further treatment to separate the value salt and the H isotopes. (D and/or T) Reference numeral 3 represents a phase (liquid or solid organic phase) containing a value or value salt and which is brought in countercurrent contact with water to be deriched. Reference numeral 4 represents enriched (D and/or T). In every stage reference numeral 5 process steps (a), (b), and (c) are carried out.

A measure for the degree of utilization of the equilibrium isotopy effect under consideration of the separation of the value salt from water adhering thereto is the separating factor. It is defined as the isotope ratio TF in the participating phases, e.g.

$$TF = \frac{(H/T) \text{ aqueous starting solution}}{(H/T) \text{ phase which contains the value after separation}} \qquad (VIII)$$

The separating factors obtained with the aid of various process variations are the basic values for observed and utilizable isotopy shifts. Since they also consider codistributed H₂O, they must be distinguished from the equilibrium isotopy effect, i.e. from the chemical equilibrium state of the exchange reaction (VII), in the course of which a heavy hydrogen isotope in an acid, aqueous solution is preferably bound to the value.

By multistage repetition of these steps (the sequence (a), (b) and (c)), it is then possible to obtain the hydrogen isotope in question in any desired purity.

For this purpose, a partial stream of a previously obtained product stream containing deuterium oxide and/or tritium oxide is returned to process step (c) in order to release, respectively, the deuterium oxide and/or the tritium oxide from the value salt in process step (c).

The separation of the reaction product containing the value or value salt which contains D or T in process step (b) can be effected by numerous techniques. For example, the separation of step (b) can be effected either by evaporation of the protic acid solution or, in the case where the protic solution is an aqueous solution, can be effected by extraction of the aqueous acid solution with the aid of an organic solvent which is immiscible with water and subsequent separation of the two resulting phases. Exemplary organic solvents suitable for the extraction of the value or of the value salt in step (b) are the substances listed in Table 1 below:

TABLE 1

Pentane
hexane
heptane
dichloromethane
chloroform
carbon tetrachloride
1,1-dichloroethane
trichloroethylene
1,1,1-trichloroethane
1,1,2-trichloroethane
tetrachloroethane
1,1-dichlorobutane
diethylether
benzene
nitrobenzene
toluene
ethyl acetate
tributyl phosphate
bis(2-ethyl hexyl) phosphoric acid The separation of the deuterized or tritiumized value or value salt in step (b) can also be effected with the aid of an acid cation exchanger and separation of the exchanger from the protic solution.

Suitable cation exchangers for use in step (b) are cross-linked synthetic resins having acid groupings, specifically the exchangers made by various manufacturers and incorporating sulfonic acid or carboxyl groups, as listed by trade name in Table 2.

TABLE 2

|  | found capacity [meq/g] |
|---|---|
| Cation exchangers indluding an -SO$_3$H anchor group, e.g. | |
| Amberlyst-15 | 1.20 |
| Dowex 50 WX 2 | 1.23 |
| Dowex 50 WX 4 | 1.23 |
| Dowex HCR-W | 1.23 |
| Dowex HGR-W | 1.23 |
| Dowex 50 W × 12 | 1.23 |
| Cation exchangers including a -CO$_2$H anchor group, e.g. | |
| Dowex CCR-1 | |
| Merck Ion Exchanger IV | 0.80 |
| Lewatit CNP | 0.82 |
| Amberlite IRC 50 | ≦0.05 |
| Amberlite IRC 84 | 0.70 |

Since the resulting onium (ammonium) salts as well as the acid anchor groups of the cation exchanger are "soft" in the sense of the HSAB principle (R. G. Pearson, Journal of the American Chemical Society, Volume 85, No. 22, (November 20, 1963), pages 3533–3539), the tendency of the reaction products to form bonds is great.

A further embodiment of the invention for performing process step (b) comprises effecting the separation of the value or value salt by precipitation from the protic solution with the aid of substances whose anions form difficulty soluble salts or compounds with at least one value.

The precipitation substance employed is at least one species from the group
tetraiodide bismuth acid (TIBA),
perchloric acid,
picric acid,
hexafluorosphoric acid,
hexafluoroantimonyic acid,
tetrafluoroboric acid.

The precipitation reaction may take place in the aqueous phase as well as, after addition of an organic solvent and separation of the resulting phases, in the organic phase. The resulting precipitate is separated from the solution in the usual manner, for example, as by filtration or decanting. In the case of the addition of an organic solvent, the latter may also be made available for reuse after the precipitate has been separated.

In the case of separation of the exchange (reaction) product (the deuterized or tritiumized value or value salt) by evaporation in step (b), the separating factor TF will be, after a contact period of about 10 minutes during which the isotope equilibrium is set, $$TF = \frac{(H/T) \text{ starting solution}}{(H/T) \text{ residue}} \quad (IX)$$

The magnitude of the separating factor depends on the extent to which the content of exchangeable hydrogen atoms, e.g. the water content, can be reduced in the residue. The process can be improved by adding to the solution to be evaporated one or a plurality of adjuvants from the group of organic liquids which form azeotropes with H$_2$O which boil in a range from 70° to 90° C. so as to facilitate or improve, respectively, the dewatering process.

Preferred adjuvants for dewatering are one or a plurality of species from the group of acetone, benzene, toluene and xylenes. However, one or a plurality of species from the group acetonitrile, t-butanol, 1,2-dichloroethane, ethanol, heptane, methanol, methyl vinyl ketone, propionitrile, 1,1,2-trichloroethane, triethylamine, vinyl butyl ether, can be used with like success as adjuvant(s) for the dewatering process.

Typical separating factors TF which can be obtained when separating by evaporation by varying values and adjuvants (and as a result residual water content) are compiled in Table 3.

TABLE 3

| Isotopy Effects During Evaporation With and Without Adjuvant | | | | |
|---|---|---|---|---|
| Value | Adjuvant | Residual water content (Mol H$_2$O/ Mol value) | TF$_{HDO}$ | TF$_{HTO}$ |
| Aminopolyether 2.2.2.$^x$ | — | 12 | 1.03 | 1.04 |
|  | — | 2 | 1.26 | 1.40 |
|  | Benzene | 4 | 1.20 | 1.30 |
|  | Toluol | 4 | 1.20 | 1.30 |
|  | Ethanol | 7 | 1.07 | 1.10 |
|  | Methanol | 7 | 1.07 | 1.10 |
|  | Acetone | 5 | 1.13 | 1.20 |

TABLE 3-continued

Isotopy Effects During Evaporation With and Without Adjuvant

| Value | Adjuvant | Residual water content (Mol H$_2$O/ Mol value) | TF$_{HDO}$ | TF$_{HTO}$ |
|---|---|---|---|---|
| Aminopolyether 2.2.1$^x$ | — | 11 | 1.30 | 1.33 |
| | — | 2 | 1.60 | 1.80 |
| | Benzene | 4 | 1.40 | 1.60 |
| | Methanol | 7 | 1.30 | 1.40 |
| Monocyclic aminopolyether 2.2.$^x$ | — | 10 | 1.02 | 1.02 |
| Crown ether 18-6 | — | 8 | 1.08 | 1.10 |

$^x$These and other designations ("2.2.2", "2.2.1", "2.2", "2.2$_{DD}$") are well known in respect to "Topics in Current Chemistry Vol. 98, p. 10; E. Weber, F. Vogtle, Springer-Verlag Berlin (1981).

In case a two-phase extraction system is used for process step (b), the two liquid phases can be introduced into adjacent contact stages according to the countercurrent principle, once the exchange and distribution equilibrium has been set.

In the simplest case, the organic phase comprises an organic solvent or solvent mixture, respectively. Or, one or a plurality of adjuvants from the group of substances in the presence of which the solubility of the value or value salts in organic liquids is increased and which facilitate and improve the phase transition of the value or value salts into the organic phase, i.e. produce a more favorable final result can be added to the aqueous and/or the organic solution. Suitable adjuvants are those which enter a bond with the onium (ammonium) salt of the value, which bond is more easily extracted than the value salt without adjuvants. Specifically, these are substances which contain "soft" anions (in the sense of the HSAB principle) and which enter more easily extractable bonds with the "soft" onium (ammonium) salt of the value while exchanging anions.

Preferably, the adjuvants employed for the extraction are one or a plurality of very soft acids from the group
  mono-(2-ethyl hexyl)phosphoric acid (H$_2$MEHP)
  bis-(2-ethylhexyl)phosphoric acid (HDEHP)
  2-ethyl hexyl/hydrogen-2-ethyl hexyl/phosphonic acid (HEH(EHP)),
  dibutyl butyl phosphonic acid (DBBP),
  bis-dodecyl naphthaline sulfonic acid (HDDNS).

With like success, adjuvants employed for the extraction can be one or a plurality of soft acids from the group hydrogen iodide,
  thiocyanic acid,
  thiosulfuric acid,
  p-toluene sulfonic acid,
  trifluoromethylsulfonic acid,
  2,4,6-trimethylbenzoic acid.

However, it is also of advantage to add to the organic solution one or a plurality of adjuvants from the group of substances which improve the solubility properties of the organic extraction agent for the value or value salts, i.e. from the group
  dibutyl phosphite,
  dibutyl phosphate (HDBP),
  tributyl phosphate (TBP)
  trioctyl phosphine oxide (TOPO),
  theonyl trifluoroacetone (HTTA).

A further possibility to improve the extraction is to add to the aqueous solution one or a plurality of adjuvants from the group of salting-out substances which reduce the solubility of the value or value salts in the aqueous extraction phase without causing the formation of a competing product with the value or value salt.

In this case, the aqueous phase is changed in such a manner that the value or its onium or ammonium salt, respectively, is preferably distributed in the organic phase without forming complexes with the value or value salt.

Advantageously, one or a plurality of salts from the group
  lithium chloride,
  lithium nitrate,
  lithium sulfate,
  magnesium chloride,
  magnesium nitrate,
  magnesium sulfate,
are used as adjuvant for the extraction.

Selected extraction agents and adjuvants are listed in Table 4 together with the distribution coefficients intended for them as well as the separating factors and the required extraction times.

TABLE 4

Selected Extracted Systems (pH = 2)

| Extraction System | | | Extraction Time [h] | Distribution Coefficient | Separating Factor | |
|---|---|---|---|---|---|---|
| Solvent | Adjuvant | Value | | | HDO | HTO |
| 1,1-dichloroethane | — | aminopolyether 2.2.2. | 6 | 5 × 10$^{-4}$ | 1.8 | 2.1 |
| 1,1-dichlorobutane | — | aminopolyether 2.2.2. | 6 | 5 × 10$^{-4}$ | 1.9 | 2.5 |
| chloroform | — | aminopolyether 2.2.2. | 4 | 3 × 10$^{-4}$ | 2.0 | 3.0 |
| diethylether | — | aminopolyether 2.2.1. | 6 | 1 × 10$^{-4}$ | 2.2 | 3.04 |
| tributyl phosphate | — | aminopolyether 2.2.2. | 3 | 2.6 × 10$^{-3}$ | 1.8 | 2.6 |
| HDEHP | — | aminopolyether 2.2.2. | 4 | 1.2 × 10$^{-2}$ | 1.8 | 2.6 |
| 1,1,2-trichloroethane | — | aminopolyether 2.2.1. | 6 | 1.6 × 10$^{-3}$ | 2.3 | 3.2 |
| 1,1,2-trichloroethane | — | aminopolyether 2.2.2. | 6 | 1.6 × 10$^{-3}$ | 2.0 | 2.9 |
| 1,1,2-trichloroethane | tributyl phosphate | aminopolyether 2.2.2. | 4 | 7.2 × 10$^{-3}$ | 1.85 | 2.5 |
| 1,1,2-trichloroethane | HDEHP | aminopolyether 2.2.$_{DD}$ | 4 | 4.9 × 10$^{-3}$ | 1.2 | 1.3 |
| 1,1,2-trichloroethane | HDEHP | aminopolyether 2.2.1. | 4 | 2.61 × 10$^{-2}$ | 1.8 | 2.35 |
| 1,1,2-trichloroethane | HDEHP | aminopolyether 2.2.2. | 4 | 2.35 × 10$^{-2}$ | 1.75 | 2.3 |
| hexane | — | aminopolyether 2.2.2. | 4 | 2.2 × 10$^{-4}$ | 1.7 | 2.4 |
| hexane | HDEHP | crown ether DC-18-6 | 4 | 2.4 × 10$^{-2}$ | 1.15 | 1.25 |
| hexane | HDEHP | aminopolyether 2.2.2. | 4 | 1.3 × 10$^{-2}$ | 1.9 | 2.4 |

In the case of separation of the deuterized or tritiumized value or value salt with the aid of an acid cation exchanger in process stage (b), one or a plurality of adjuvants from the group of lithium salts which facilitate(s) or improve(s), respectively, the fixing of the value or value salt at the cation exchanger preferably are added to the aqueous solution. Suitable adjuvants for this purpose are one or a plurality of salts from the group
- lithium chloride,
- lithium nitrate,
- lithium sulfate,
- lithium acetate.

In this way, with the adjuvant, the capacity of the ion exchanger employed can be utilized more rapidly and more completely than if the adjuvant were not present. The separating factors for various values are listed in Table 5 below in conjunction with the already mentioned types of ion exchangers.

TABLE 5

| | | | Separating Factor | |
|---|---|---|---|---|
| Value | | Ion Exchanger (Trade Name) | HDO | HTO |
| Aminopolyether | 2.2 | Dowex 50 WX 4 | 6 | 12 |
| | 2.2.1. | Dowex 50 WX 4 | 8 | 20.5 |
| | | NCR-W | 8.5 | 22 |
| | | Amberlite IRC 50 | 8 | 20 |
| | 2.2.2. | Dowex HCR-W | 7 | 16 |
| | | Dowex CCR-1 | 5 | 10 |
| | | Amberlyst 15 | 4.8 | 9.8 |
| | | Lewatit SPC 108 | 6 | 14 |
| Crown ether | 18-6 | Dowex 50 WX 4 | 4.8 | 9.6 |

After completion of the separation in step (b) of the value or value salt, respectively, containing D and/or T from the starting solution, the value or the salt, respectively, is present in any one of a number of different forms depending on the particular separation method employed in step (b). Thus, for example, the value or the value salt, respectively, is present in dissolved form in the organic phase in the case of extraction, and in solid form bound to the ion exchanger in the case of use of the latter. The value or value salt present in these forms can be treated according to a number of different techniques. In one technique, the value or value salt containing D and/or T is treated directly, in the form it is in as it comes from step (b), to release D and/or T. In another technique, the value or value salt containing D and/or T is subjected to a preliminary treatment as it comes from step (b), and only after the preliminary treatment is it treated to release D and/or T. For example, in the case of extraction in step (b), the preliminary treatment can be a separation of the extracted salt from the organic phase by distilling away the organic solvent. Another possibility for a preliminary treatment is a separation of the value salt from the organic phase by bringing the organic phase in contact with an aqueous acid whose specific concentration of heavy isotopes is adapted, by recycling part of the product stream, to the enrichment ratios existing in the value salt, and in that the value containing the heavy isotope changes to the aqueous phase (strip reaction). A 1M to 5M mineral acid is used for the strip reaction.

In the case where the value or value salt, respectively, is bound to an ion exchanger in step (b), the preliminary treatment can be effected by bringing the ion exchanger in contact with or eluting with an aqueous acid of a set (adapted) concentration of heavy isotopes adapted to the enrichment ratios existing in the value or value salt, so that the value containing the heavy isotope is transferred to the aqueous phase and the ion exchanger is regenerated.

In the final stages of the countercurrent systems there is obtained, on the one hand, water enriched with D and/or T and, on the other hand, free value, in process step (c). The release of deuterium oxide and/or tritium oxide from the value or value salt in process step (c) or from its protic solution is performed by treatment with a base. Such base is a substance whose cation does not, or not very easily, form complexes with the value, specifically a tetraalkyl ammonium hydroxide and/or an ammonium hydroxide of cyclic amines and/or lithium hydroxide and/or cesium hydroxide and/or lithium carbonate.

The tetraalkyl ammonium hydroxide employed is one or a plurality of species from the group
- tetramethyl ammonium hydroxide,
- tetraethyl ammonium hydroxide,
- tetrapropyl ammonium hydroxide,
- tetra-n-butyl ammonium hydroxide,
- tetra-t-butyl ammonium hydroxide.

Good results are obtained with ammonium hydroxides of cyclic amines in the form of one or a plurality of species wherein the cyclic amine is from the group
- pyrrole,
- pyrrolidine,
- pyridin,
- benzopyrrole,
- quinoline.

Preferably, the base is employed in the form of an aqueous solution which contains the heavy hydrogen isotope to be enriched in the same concentration as the value salt (before its release).

The treatment with the base initiates a neutralization reaction according to the following formula where Do=donor; X⁻ =salt anion; Ka⁺ =cation of the base. In the course of this reaction, identically enriched water is formed as a volume addition and can be removed as product.

The treatment with the base can be effected directly on a value or value salt which is at or in a carrier phase as it comes from step (b) such as, for example, an organic solution or cation exchanger employed in step (b), to effect the release of the deuterium oxide and/or the tritium oxide from the value or value salt and the separating of the deuterium oxide and/or tritium oxide from the value.

If the variation "evaporation of the aqueous solution" is used in step (b) to separate the value salt containing D and/or T, the recovery of water enriched with D and/or T is effected by dissolving the salt residue in the aqueous solution of a base containing the enriched isotope in the same concentration as the onium (ammonium) salt. According to equation (X) there will then take place a neutralization reaction and an increase in the volume of enriched water. This enriched water can be separated by evaporating it from the dissolved salts.

The value then can be extracted from the evaporation residue by treatment with organic solvents and can be reused after evaporation of the solvent. Suitable organic solvents are those listed in Table 1.

It is also possible, however, to dissolve the solid evaporation residue remaining after separation of the enriched water in fresh water (H₂O) and to separate the value from the salt of the base at a column filled with a cation exchanger (alkali form). The cation of the base is here preferably retained and the value is eluted.

Finally, the value can be separated from the water solution of the residue by extraction with the organic solvents listed in Table 1 and can be recovered by way of evaporation and reused.

If the variation "extraction from the aqueous starting solution" is used in step (b) to separate the value salt containing D and/or T, the onium (ammonium) salt of the value generally is present both in the organic phase which is an enriched phase and in the aqueous phase, which is a deriched phase. The salt of the value in both of these phases can, after passing through the final stage of the multistage distribution system, be separated from its respective phase carrier and separated into recyclable value and water enriched with heavy hydrogen.

For recycling the value the aqueous, deriched phase can be treated directly with the solution of a base which contains a noncomplexing cation and whose concentration of hydrogen isotopes has been adapted, by recycling a partial product stream, to the degree of derichment realized. In this case, the neutralization reaction (X) takes place. There is produced free value and deriched water.

Various possibilities exist after the neutralization for the separation from the deriched water of the free value to be recycled.

One possibility is to evaporate the water matrix, to extract the value from the residue with the aid of a solvent listed in Table 1 and thus make the value available for recycling. The residue of the value extraction and the evaporated water are discarded as waste.

Another possibility is to separate the mixture in a cation exchanger column in such a manner that the value is preferably bound to the exchanger and is separately eluted from there with the aid of one of the acids listed in Table 6 and thus made available for recycling. The primary eluate is discarded as waste.

TABLE 6

Acids for the Elution of the Value hydrocholoric acid (muriatic acid),
sulfuric acid,
nitric acid,
phosphoric acid,
hydrobromic acid,
trifluoro acetic acid
aryl sulfonic acids, specifically:
benzene sulfonic acid,
toluene sulfonic acid,
aryl sulfinic acids, specifically:
benzene sulfinic acid,
alkyl sulfonic acids, specifically:
methane sulfonic acid,
ethane sulfonic acid,
alkyl sulfinic acid, specifically:
methane sulfinic acid,
ethane sulfinic acid.

A third possibility is to extract the deriched aqueous phase with one of the organic solvents listed in Table 1. The value is converted to the organic phase and is thus made ready for recycling. The aqueous phase is discarded as waste.

Various ways are likewise available to process the organic phase enriched with D and/or T from the extraction.

One way, for example, is to evaporate the solvent away and thus make it available for reuse. The processing of the residue and thus the recovery of water enriched with heavy H isotopes takes place as described above, such as by dissolving the residue in the aqueous solution of a base containing the enriched isotope in the same concentration as the onium (ammonium salt) to effect neutralization, and then separating the enriched water by evaporation.

Another possibility is to slowly feed the solution through the column of a cation exchanger which has been soaked in the organic solvent employed. This causes the value salt to be retained. The extraction agent is made avaliable for reuse in the eluate. The value salt is split as described above, enriched water is removed as the product, and the value is recycled. Thus, to effect the splitting, the cation exchanger is eluted with a solution of a base having a noncomplexing cation and whose concentration of heavy isotopes is adapted to avoid redilution to thereby effect neutralization. There is produced free value which remains on the exchanger and enriched water as eluate. The value can then be eluted with acid, such as those listed in Table 6, and thereby is made available for recycling.

Another processing possibility for the organic extraction phase is to bring the organic phase containing the onium (ammonium) salt of the value in contact with a liquid phase of a different composition so that re-extraction occurs into that liquid phase (strip extraction).

This can be accomplished, for example, by treatment with an aqueous acid whose concentration of hydrogen isotopes is adapted to the realized degree of enrichment by utilizing a partial quantity of the product stream.

Suitable acids and the measured distribution coefficients (VK) and contact times are listed as examples in Table 7. Generally, a 5 to 10 stage extraction process is sufficient for stripping the value salt.

TABLE 7

| Acid Strip Reaction - for the Example of Aminopolyether 2.2.2. | | | |
|---|---|---|---|
| Acid | Concentration | Extraction Time (h) | $VK = \frac{C_{aqueous}}{C_{organic}}$ |
| HCl | 1 M | 1.0 | $4 \times 10^2$ |
| HCl | 5 M | 1.0 | $2.5 \times 10^3$ |
| HNO$_3$ | 1 M | 1.0 | $3.5 \times 10^2$ |
| H$_2$SO$_4$ | 1 M | 1.0 | $7 \times 10^2$ |

The aqueous extraction (strip) solution is then converted with a base. According to neutralization equation (X), there then results the free value and enriched water. The water is evaporated away. The residue is extracted with one of the organic solvents listed in Table 1 and the value contained in the extracted phase is reused. The remaining base salt is discarded as waste.

Another possibility is to extract the organic phase with the aqueous solution of a base whose cation will not form complexes with the value and whose concentration of hydrogen isotopes is adapted to the realized degree of enrichment by utilizing a partial quantity of the product stream. Suitable bases are listed as examples in Table 8 together with the measured distribution coefficients ($VK_{APE}$) and contact times. The complete re-extraction of the enriched hydrogen isotope is generally successful in a 5 to 10 stage extraction process. The value then remains in the organic phase, which is reused in its existing form.

The aqueous phase is evaporated and the thus enriched water is separated from the salt of the base which is discarded as waste.

TABLE 8

Basic Strip Reaction - for the Example of Aminopolyether 2.2.2.

| Base | Extraction time (h) | $VK_{APE} = \dfrac{C_{aqueous}}{C_{organic}}$ |
| --- | --- | --- |
| tetraethyl ammonium hydroxide | 1 | $1.7 \times 10^{-1}$ |
| tetramethyl ammonium hydroxide | 1 | $1.6 \times 10^{-1}$ |
| lithium hydroxide | 0.5 | $2.3 \times 10^{-2}$ |
| lithium carbonate | 5 | $2.4 \times 10^{-2}$ |

If the "ion exchanger" mode is used in step (b) for the separation of the value salt containing D and/or T from the starting solution, then, after phase separation, as by filtration, the onium (ammonium) salt of the value is split in the final stages by neutralization in a column so as to obtain enriched water and/or recover the value, respectively.

The recovery of enriched water and free value or ion exchanger, respectively, is effected by elution of the charged ion exchanger with a base.

According to Equation (X), this causes the onium (ammonium) salt to be split already during the elution process.

In the preparation of the base solution, care must be taken that the cation of the base does not undergo a competing complexing reaction which would compete with the value;

the value remains at the ion exchanger;

the aqueous base solution is adapted, with respect to the ratio of hydrogen isotopes, to the isotope ratio obtained by the enrichment step, so as to avoid redilution.

The enriched water is removed as product. The ion exchanger, which is charged with neutral values, can be reused in this form in the corresponding separation stage (b). Or, value and ion exchanger can be separated by elution with an acid.

Figure 2:
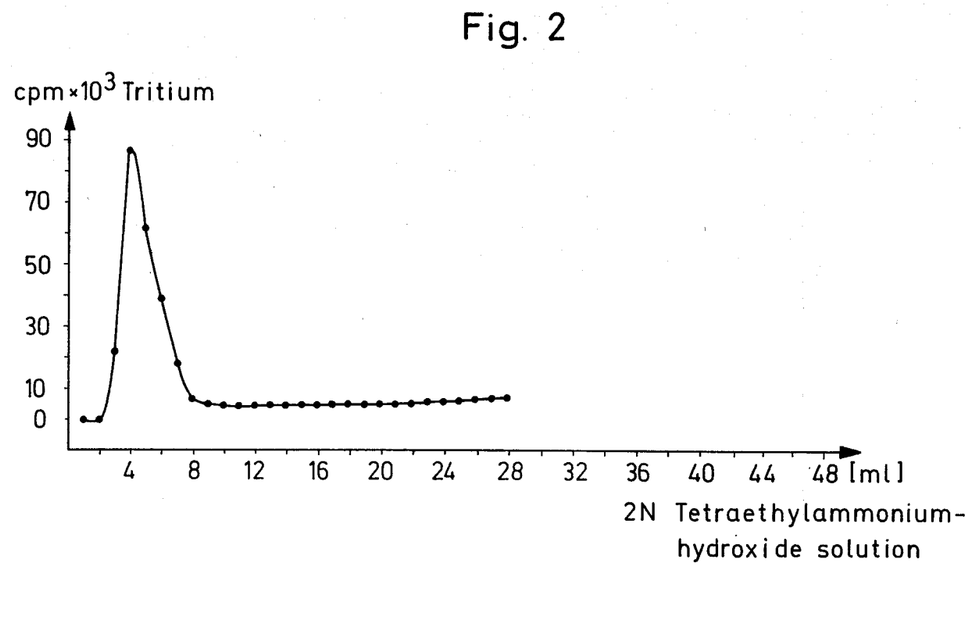
FIG. 2 shows a typical elution curve for HTO, the elution curve being for elution of a cation exchanger containing a value to which is bound HTO in accordance with one embodiment of the present invention.

Another manner of treating the aqueous phase from step (a) is to feed the aqueous solution through a column of a cation exchanger. This causes the value salt to be bound to the exchanger. The eluate is discarded as waste. Then a subsequent elution is performed with a base containing a noncomplexing cation to release the D or T while the free value remains on the ion exchanger. The treatment with the base is effected with a solution of a base whose concentration of hydrogen isotopes has been adapted to the isotope concentration of the value. FIG. 2 shows a typical elution curve for HTO (measured as counts per minute $\times 10^3$ Tritium activity), obtained with a 2N KaOH*) solution. The value, identified as C-14, remained on the column, and no C-14 activity could be detected in the eluate. The value remaining on the ion exchanger is then eluted with one of the acids listed in Table 6 and thus is made available for recycling in proton salt form.

*)Ka-=Kation of the base, in FIG. 2: Tetraethylammonium ion.

Finally, it possible to treat the aqueous phase from step before neutralization by precipitating the value salt contained in the aqueous phase, or after addition of an organic solvent and separation of the resulting phases, in the organic phase by means of suitable precipitating reagents, such as those previously described, for example, tetraiodide bismuth acid. The resulting precipitate is then separated from its phase carrier in the usual manner, for example, by filtration or decanting.

After separation of the precipitate, the organic extraction agent is made available for reuse in the case where an organic solvent was employed. In either case, the separated precipitate is received by a base whose cations do not form complexes with the value and whose concentration of heavy H isotopes is adapted to the resulting degree of enrichment by utilization of a partial quantity of the product stream to effect the neutralization reaction (X). The resulting aqueous solution can then be processed further according to any one of various possibilities described above for the separation, after the neutralization, from the deriched water of the free value to be recycled.

The following examples are given by way of illustration to further explain the principles of the invention. These examples are merely illustrative and are not to be understood as limiting the scope and underlying principles of the invention in any way. All percentages referred to herein are by weight unless otherwise indicated.

EXAMPLE 1

Separation of the Exchange Product by Evaporation

To 10 ml of a solution containing $H_2O$, 0.69 ml of a 30% HCl solution and 25.0 MBq*) tritium as HTO, there is added 6.13 mMol of monocyclic aminopolyether 2.2. This mixture is shaken for approximately 5 minutes. At room temperature the aqueous phase is removed completely by evaporation in vacuo, after 0.50 ml acetone has been added as adjuvant.

*)MBq=Mega-Bequerel=$10^6$ transmutations per second

The aqueous phase is collected in a cooling trap.

To obtain the tritium ions enriched at the aminopolyether, the dry aminopolyether salt is mixed with 9.0 ml of a 30% aqueous solution of tetraethyl ammonium chloride and the free aminopolyether is extracted with the aid of 10 ml 1,1,2-trichloroethane. To remove the aminopolyether, this extraction is performed three times.

From the 30 ml 1,1,2-trichloroethane extraction solution, the aminopolyether is recovered by evaporating away the solvent.

The remaining aqueous solution enriched with tritium and containing tetraethyl ammonium salt is likewise evaporated in vacuo to recover the HTO and the water enriched with tritium is collected in a cooling trap. Its specific activity is 2.8 MBq/ml. The residue is discarded.

EXAMPLE 2

Separation of the Exchange Product by Evaporation 1.5 g (5.67 m Mol) crown ether 18-6 are dissolved in 10 ml of 2N hydrochloric acid having a tritium activity (in the form of HTO) of 25 MBq. The solution is shaken for 5 minutes.

At room temperature the aqueous phase is removed by evaporation in an oil pump vacuum.

To obtain the tritium ions enriched at the crown ether, the syrupy residue is mixed with 10.5 ml of a 30% tetraethyl ammonium hydroxide solution (specific T-activity 2.75 MBq/ml), is evaporated in vacuo, and the water enriched with tritium is collected in a cooling trap. Its specific activity is 2.75 MBq/ml.

To separate the crown ether from the resulting tetraethyl ammonium chloride, the residue is mixed with 100 ml water and fed through an ion exchanger column. The column comprises 20 g of the highly acid cation exchanger DOWEX 50 WX 4 in the Li+ form. The tetraethyl ammonium cation is here bound to the resin and the crown ether is eluted together with the lithium chloride.

The column is washed with approximately 100 ml H₂O. From the approximately 200 ml of solution, the crown ether is recovered by repeated extractions each time with 25 ml hexane, and subsequent evaporation of the extraction agent.

EXAMPLE 3

Separation of the Exchange Product by Evaporation 2.0 g (5.4 mMol) of a salt of aminopolyether 2.2.2. containing 2 ml HCl is dissolved in 10 ml water having a tritium activity of 2.5 g MBq. To set the H/T equilibrium, the solution is shaken for approximately 10 minutes. At room temperature, the aqueous phase is completely removed by evaporation in an oil pump vacuum.

To obtain the tritium ions enriched at the aminopolyether, the dry salt is mixed with 5 ml of a 30% aqueous tetramethyl ammonium hydroxide solution, is evaporated in vacuo and the water enriched with tritium and having a specific T activity of 0.35 MBq/ml is collected in a cooling trap.

To separate the aminopolyether 2.2.2. from the resulting tetramethyl ammonium chloride, the dry residue is mixed with approximately 150 ml H₂O and fed into an ion exchanger column. The column comprises 20 g of a highly acid cation exchanger DOWEX 50 WX 4 in the Li+ form. The tetramethyl ammonium cation is here bound to the resin. The aminopolyether 2.2.2. is eluted together with LiCl.

The column is washed with approximately 100 ml H₂O. From the approximately 250 ml of solution, the aminopolyether is converted to the organic phase by three times repeated extraction with 25 ml 1,1,2-trichloroethane and is then released by evaporation of the solvent and made available for recycling. The aqueous solution is discarded.

EXAMPLE 4

Separation of the Exchange Product by Evaporation 1.92 g (10 mMol) triethylene glycol dimethyl ether are added to 10 ml of an aqueous hydrochloric acid solution having a specific T-activity of 2 MBq/ml and a pH of 1 and are stirred intensively for 15 minutes.

The aqueous phase is freeze dried to evaporate the water which is then condensed. The condensed aqueous solution is discarded.

To free the tritium ions enriched at the triethylenglycoldimethyl ether, the resulting residue is mixed with 10 ml of 2M tetrapropylene ammonium hydroxide (specific T-activity 2 MBq/ml). The resulting water is likewise removed by freeze-drying. It is enriched with tritium and has a specific activity of 2.05 MBq/ml.

To separate the resulting tetrapropylene ammonium salt from the triethylenglycoldimethyl ether, the residue is extracted three times with chloroform. The residue is discarded. The chloroform solvent is removed by destillation from the organic extraction phase and the triethylene glycol dimethyl ether is made available for reuse.

EXAMPLE 5

Separation of the Exchange Product by Precipitation 1.5 g (7.06 mMol) aminopolyether 2.1. are dissolved in 15 ml of 1N hydrochloric acid having a tritium activity of 43.5 MBq.

To set the H/T equilibrium, the solution is shaken for approximately 10 minutes.

By adding tetraiodo bismuth acid, the aminopolyether salt is precipitated and extracted from the solution. The tritium ions enriched at the aminopolyether are obtained by dissolving the salt in 9.5 ml of a 30% aqueous tetraethyl ammonium hydroxide solution. The free aminopolyether is extracted with the aid of 10 ml 1,1,2-trichloroethane. The extraction is performed three times so as to remove the aminopolyether. From the 30 ml of 1,1,2-trichloroethane extraction solution, the aminopolyether is recovered by evaporation of the solvent and is made available for reuse.

The aqueous tetraethyl ammonium chloride containing solution which is enriched with tritium is evaporated in vacuo to obtain the HTO and the water which is enriched with tritium and has a specific activity of 3.0 MBq/ml, is collected in a cooling trap. The residue is discarded.

EXAMPLE 6

Separation of the Exchange Product by Precipitation 1.8 g (5.41 mMol)) aminopolyether 2.2.1. are dissolved in 12.5 ml of 1.0N hydrochloric acid having a tritium activity of 31.3 MBq. To set the H/T equilibrium, the solution is shaken for approximately 10 minutes.

By adding tetraiodo bismuth acid, the aminopolyether salt is precipitated and the residue is extracted from the solution. The tritium ions enriched at the aminopolyether are obtained by dissolving the salt in 9.5 ml of a 30% aqueous tetramethyl ammonium hydroxide solution. The free aminopolyether is extracted with the aid of 10 ml 1,1,2-trichloroethane. The extraction is performed three times so as to remove the aminopolyether. The aminopolyether is recovered from the 30 ml 1,1,2-trichloroethane extraction solution by evaporating the solvent. The solvent is made available for reuse.

The aqueous solution which is enriched with tritium and contains tetramethyl ammonium salt is evaporated in vacuo in order to obtain the HTO, and the water enriched with tritium is collected in a cooling trap. Its specific activity is 2.6 MBq/ml. The remaining salt is discarded.

EXAMPLE 7

Separation of the Exchange Product by Means of an Ion Exchanger 6.13 mMol of the bicyclic aminopolyether 2.2.2 are added to 10 ml of an aqueous solution containing 0.69 ml of a 30% HCl solution and 2.5 mMol deuterium in the form of HDO. The mixture is shaken briefly to dissolve the aminopolyether, and 10 g of the cation exchanger DOWEX 50 WX 4 in its H+ form are added to this solution.

The solution, together with the cation exchanger, is shaken for approximately 10 minutes at room temperature. The ion exchanger phase which contains the aminopolyether 2.2.2 is separated from the liquid phase by filtration.

The ion exchanger is fed into a column and carefully rinsed with 45 ml of an aqueous 30% tetraethyl ammonium hydroxide solution having a D concentration of approximately 2 mMol/ml. The eluate then contains a solution which is enriched with deuterium (1.7 mMol deuterium oxide/l). The aminopolyether 2.2.2 is still on the cation exchanger. It is removed again from the exchanger matrix by charging the ion exchanger with 4 N HCl and is fed to an ion exchanger column (approximately 10 DOWEX 1 X 4 in the OH⁻ form). The free aminopolyether is released from the eluate by evaporating away the aqueous solution and is returned to use.

EXAMPLE 8

Separation of the Exchange Product by Means of an Ion Exchanger 6.48 mMol of the bicyclic aminopolyether 2.2.1. are added to 10 ml of an aqueous solution containing 0.69 ml of a 30% HCl solution and 2.5 MBq tritium in the form of HTO. After briefly shaking the mixture, 10 g ion exchanger Amberlyst 15 in the H+ form are added.

The solution, together with the ion exchanger, is shaken for approximately 10 minutes and then filtered. The solid phase of the ion exchanger separated thereby is fed to a column, and eluted with 45 ml of an aqueous 30% tetramethyl ammonium hydroxide solution having a specific T activity of approximately 5 MBq/ml.

The eluate is thereby enriched with tritium (specific activity 4.8 MBq/ml). The aminopolyester 2.2.1. is still on the cation exchanger. It is separated by elution with a 1N lithium chloride solution. The eluate is extracted with 1,1,2-trichloroethane. The aminopolyether 2.2.1. is thus transferred to the organic phase. By evaporating the solvent, the aminopolyether is released and returned to use. The aqueous phase is discarded.

EXAMPLE 9

Separation of the Exchange Product by Means of Ion Exchanger 5.88 mMol of the monocyclic aminopolyether 2.3. are added to 10 ml of an aqueous solution containing 0.7 ml of a concentrated (36%) hydrochloric acid solution and 2.5 MBq tritium. To dissolve the aminopolyether, the mixture is shaken for approximately 20 minutes and 10 g of the ion exchanger DOWEX HCR-W in its H+ form are added to the solution. The solution, together with the cation exchanger, is shaken at room temperature for approximately 20 minutes. The ion exchanger phase is separated from the liquid phase by filtration. The aminopolyether cation is on the ion exchanger.

The ion exchanger is fed to a column and rinsed with 50 ml of a 30% aqueous tetraethyl ammonium hydroxide solution having a specific tritium activity of 3.5 MBq/ml. The resulting elutate is enriched with tritium (specific activity 3.5 MBq/ml). The aminopolyether 2.3. is still on the cation exchanger. It is removed from the exchanger matrix by elution with 4N HCl and the solution is fed to an anion exchanger column (approximately 10 g DOWEX 1 X 2 in the (OH⁻ form). The free aminopolyether is released from the eluate by evaporation of the aqueous solution and is made available for reuse.

EXAMPLE 10

Separation of the Exchange Product by Extraction

One Mol (262 g) of aminopolyether 2.2. is added to 1 liter of an acid aqueous solution having a specific activity of tritium of 1.5 MBq/ml and then the pH is set to the value 1 with hydrochloric acid or with nitric acid (concentrated).

Three liters of an approximately 20% (0.8M) solution of bis-(2-ethylhexyl) phosphoric acid (HDEHP) in 1,1,2-trichloroethane are added to this aqueous phase. The two phases are brought into intimate contact with one another for four hours by stirring or shaking so as to set the distribution and exchange equilibria.

After separation of the phases, the aqueous phase, which still contains approximately 94% of the initial aminopolyether employed, is processed as follows:

The solution is mixed with double the quantity of 2M tetrabutyl ammonium hydroxide solution in deriched water. The resulting water is evaporated away after stirring for 10 minutes. The residue is received by 1,1,2-trichloroethane with tetrabutyl ammonium chloride/nitrate remaining behind. The organic solvent is evaporated and the resulting aminopolyether is returned to use. The evaporated water and the residue are discarded.

The organic phase of the extraction is shaken for one hour with 5M hydrochloric acid. After separation of the phases, the organic solvent is returned to use. The resulting aqueous phase, which contains the aminopolyether salt, is neutralized with 2M tetrabutyl ammonium hydroxide solution having a specific activity of approximately 2 MBq/ml. The water is evaporated away and then condensed. The condensate is enriched with tritium having a specific activity of 2 MBq/ml. The residue is received by 1,1,2-trichloroethane, is separated from undissolved tetrabutyl ammonium chloride and the solvent is evaporated. The free value is returned to use. The filtrate is discarded.

EXAMPLE 11

Separation of the Exchange Product by Extraction 2.1 Mol hydrochloric acid or nitric acid are added to one liter of an acid, aqueous solution having a tritium specific activity of 1.5 MBq/ml.

Three liters of an organic solution comprising 0.33M of the aminopolyether $2.2.2._D$ and 0.8M of HDEHP, dissolved in 1,1,2-trichloroethane are added to this aqueous phase. The two phases are mixed intensively and are separated after four hours. There will then exist a distribution coefficient with respect to tritium of $2.5 \times 10^{-2}$.

Since the aminopolyether is not soluble in water, the T-deriched aqueous phase can be discarded.

The organic phase is shaken for one hour with a 2M tetraethyl ammonium hydroxide solution having a specific T-activity of approximately 3.5 MBq/ml. The aminopolyether remains in the organic phase and is made available for reuse in that form. From the resulting aqueous phase, the tritium enriched water having a specific activity of 3.5 MBq/ml is separated by evaporation. The remaining tetraethyl ammonium chloride is discarded.

EXAMPLE 12

Separation of the Exchange Product by Extraction

One liter of an acid, aqueous solution having a specific activity of 1.5 MBq/ml is mixed with one Mol crown ether 18-crown-6 and is set to a pH of 1 with hydrochloric acid.

As the extraction phase, 10 l hexane are added. After four hours of mixing, the phases are separated.

Approximately 97% of the onium salt of the polyether remain in the aqueous phase.

The aqueous phase is fed into a column containing the ion exchanger DOWEX 50 WX 4 (50–100 mesh; length of column 3 m, diameter 10 cm). This causes the crown ether in proton salt (onium) form to be retained, and the eluate is discarded as waste. During the subsequent elution with tetramethyl ammonium hydroxide having a specific activity of tritium of approximately 1.9 MBq/ml, an eluate is obtained which is a T-enriched water having a specific activity of 2 MBq/ml. The bound crown ether is eluted with 1N hydrochloric acid. The acid crown ether solution is made available for reuse. The organic phase is shaken for 1 hour with an approximately 0.1M tetramethyl ammonium hydroxide solution wherein the base should have a specific activity of approximately 2 MBq/ml. The aqueous phase is evaporated and the evaporated water is then condensed. The condensate, having a specific activity of 2 MBq/ml is combined with the already obtained T-enriched aqueous solution and forms the product. The remaining tetramethyl ammonium chloride is discarded.

The crown ether remaining in the organic phase is freed from the solvent and is returned to circulation in an acid, aqueous solution.

EXAMPLE 13

Separation of the Exchange Product

An acid aqueous solution having a deuterium concentration of 2.5 mMol/l is set with hydrochloric acid so that it is 2.1M for $H^+$. Then 0.1 Mol freshly prepared thiocyanic acid solution are added.

An 0.2M solution of aminopolyether $2_D2_D$ in 1,1,2-trichloroethane is added to this aqueous phase. The two phases are shaken together for six hours and then the phases are separated. The aqueous phase is deriched in D and is discarded.

The organic solvent is evaporated away from the organic phase and is made available for reuse. The residue is received by a 2M tetramethyl ammonium hydroxide solution having a deuterium enrichment of at least 0.0015 mol %. The water that has formed is evaporated away and then condensed. The condensate includes D enriched water having a D-concentration of 3 mMol/l. The residue of tetramethyl ammonium chloride is discarded. The recovering of the aminopolyether is analogue to Example 10.

It will be understood that the above description of the present invention is susceptible to various modifications, changes and adaptations, and the same are intended to be comprehended within the meaning and range of equivalents of the appended claims.

What is claimed is:

1. Process for enriching and separating heavy hydrogen isotopes having a heavy hydrogen cation of deuterium and/or tritium from substance streams containing them, wherein the respectively present hydrogen isotopes are exchanged in chemical equilibria, comprising:

(a) bringing a protic acid solution containing the deuterium and/or the tritium in contact with a value material selected from the group of open chained polyethers or aminopolyethers, macro-monocyclic or macro-polycyclic polyethers, or macro-monocyclic or macro-polycyclic aminopolyethers, or mixtures of these value materials, in free or proton salt form, to form a reaction product of the heavy hydrogen cation with the value or value salt and bring about enrichment of deuterium and/or tritium in the reaction product;

(b) separating the reaction product containing the value or value salt from the solution; and

(c) releasing from the separated reaction product in the form of deuterium oxide (HDO) and/or tritium oxide (HTO), the hydrogen isotope(s) to be enriched, by regenerating the value or its salt, respectively, and returning the value or its salt for reuse.

2. Process as defined in claim 1, wherein the value material is a species or a mixture of open chained polyethers or aminopolyethers having a structure corresponding to the general formula where
X=O, or NH;
n=a number from 0 to 5; and
$R_1$, $R_2$ independently=alkyl, aryl, or polymer.

3. Process as defined in claim 1, wherein the value material is a species or a mixture of macrocyclic polyethers having a structure corresponding to the general formula where
n=a number from 0 to 6;

R'=polymer, alkyl, alkyl—O—, or alkyl—$CH_2NH$—.

4. Process as defined in claim 1, wherein the value material is a species or a mixture of macromonocyclic aminopolyethers having a structure corresponding to the general formula

(III)

where
m, n independently = 0, 1, or 2;
$R_3$, $R_4$, $R_5$ independently = H, or alkyl having 1 to 20 C atoms $R_1$, R' = —polymer, —alkyl, —O—alkyl, or —NH—CH$_2$—alkyl.

5. Process as defined in claim 1, wherein the value material is a species or a mixture of macrobicyclic aminopolyethers having a structure corresponding to the general formula (IV)

where
m, n independently = 0, 1, or 2
$R_1$,

R' = —polymer, —alkyl, —O—alkyl, or —NH—CH$_2$—alkyl.

6. Process as defined in claim 1, wherein the value material is a species or a mixture of macropolycyclic aminopolyethers.

7. Process as defined in claim 6, wherein the value material is a species or a mixture of the macropolycyclic aminopolyethers, having a structure corresponding to one of the general formula A, B or C where X = O, NH, or CH$_2$.

8. Process as defined in claim 1, wherein for the respective release of the deuterium oxide and/or the tritium oxide from the value or value salt in process step (c), a partial stream of a previously obtained product stream which contains deuterium oxide and/or tritium oxide is returned to process step (c).

9. Process as defined in claim 1, wherein the separation in step (b) of the value or value salt containing D or T is effected by evaporating the protic acid solution.

10. Process as defined in claim 9, wherein, in order to facilitate or improve evaporation, one or a plurality of adjuvants selected from the group of organic liquids which with H$_2$O form azeotropes that boil in a range from 70° to 90° C. are added to the solution to be evaporated.

11. Process as defined in claim 10, wherein the adjuvant is one or a plurality of species selected from the group of acetone, benzene, toluene and xylenes.

12. Process as defined in claim 10, wherein the adjuvant is one or a plurality of species selected from the group of acetonitrile, t-butanol, 1,2-dichloroethane, ethanol, heptane, methanol, methyl vinyl ketone, propionitrile, 1,1,2-trichloroethane, triethylamine, and vinyl butyl ether.

13. Process as defined in claim 1, wherein the protic solution is an aqueous solution, and the separation of the value or value salt containing D or T in step (b) is effected by extracting the aqueous acid solution with an organic solvent that is not miscible with water to form an aqueous phase and an organic phase, and separating the two phases.

14. Process as defined in claim 13, wherein one or a plurality of adjuvants selected from the group of substances in the presence of which the solubility of the value or value salt in organic liquids is increased and which facilitate or improve the transfer of the value or value salt into the organic phase are added to the aqueous solution and/or organic solvent.

15. Process as defined in claim 14, wherein said adjuvants are one or a plurality of very soft acids selected from the group mono-(2-ethyl hexyl) phosphoric acid ($H_2MEHP$), bis-(2-ethyl hexyl) phosphoric acid (HDEHP), 2-ethyl hexyl/hydrogen-2-ethyl hexyl/-phosphonic acid (HEH(EHP)), dibutyl butyl phosphonic acid (DBBP), and bis-dodecyl naphthaline sulfonic acid (HDDNS).

16. Process as defined in claim 14, wherein said adjuvants are one or a plurality of soft acids selected from the group hydrogen iodide, thiocyanic acid, thiosulfuric acid, p-toluene sulfonic acid, trifluoromethyl sulfonic acid, and 2,4,6-trimethyl benzoic acid.

17. Process as defined in claim 13, wherein one or a plurality of adjuvants selected from the group of substances which improve the solubility properties of the organic extraction agent for the value or value salt are added to the organic solvent.

18. Process as defined in claim 17, wherein the substances which improve the solubility properties are selected from the group dibutyl phosphite, dibutyl phosphate (HDBP), tributyl phosphate (TBP), trioctyl phosphine oxide (TOPO), and theonyl trifluoroacetone (HTTA).

19. Process as defined in claim 13, wherein one or a plurality of adjuvants selected from the group of salting-out substances which reduce the solubility of the value or value salt in the aqueous extraction phase without causing the formation of a competing product with the value or value salt are added to the aqueous solution.

20. Process as defined in claim 19, wherein the salting-out adjuvants are one or a plurality of salts selected from the group lithium chloride, lithium nitrate, lithium sulfate, magnesium chloride, magnesium nitrate, and magnesium sulfate.

21. Process as defined in claim 13, wherein the extracted value or value salt is separated from the organic phase by distilling away the organic solvent.

22. Process as defined in claims 13, wherein the separated organic phase is brought in contact with an aqueous acid whose specific concentration of heavy isotopes is adapted to the enrichment ratios existing in the value or value salt by returning part of a previously obtained product stream to strip and transfer the value or value salt containing the heavy isotope to an aqueous phase.

23. Process as defined in claim 22, wherein a 1M to 5M mineral acid is used for the strip reaction.

24. Process as defined in claim 13, wherein the release of the deuterium oxide and/or of the tritium oxide from the value or value salt contained in the organic phrase and separation of the deuterium oxide and/or of the tritium oxide from the value or value salt is effected by treatment with a base.

25. Process as defined in claim 24, wherein the base employed is a substance whose cation is not or only slightly complexed by the value or value salt.

26. Process as defined in claim 24, wherein the base employed is at least one material selected from a tetraalkyl ammonium hydroxide, an ammonium hydroxide of a cyclic amine, lithium hydroxide, lithium carbonate or cesium hydroxide.

27. Process as defined in claim 26, wherein the tetraalkyl ammonium hydroxide employed is one or a plurality of species selected from the group tetramethyl ammonium hydroxide, tetraethyl ammonium hydroxide, tetrapropyl ammonium hydroxide, tetra-n-butyl ammonium hydroxide, and tetra-t-butyl ammonium hydroxide.

28. Process as defined in claim 26, wherein the cyclic amine for the ammonium hydroxide of cyclic amine employed is one or a plurality of species selected from the group pyrrole, pyrrolidine, pyridin, benzopyrrole, and quinoline.

29. Process as defined in claim 24, wherein the base contains the heavy hydrogen isotope to be enriched in the same concentration as the value or value salt before its release.

30. Process as defined in claim 1, wherein the separation of the deuterized or tritiumized salt in step (b) is effected by contacting the protic solution with an acid cation exchanger and separating the exchanger from the protic solution.

31. Process as defined in claim 30, wherein the separated ion exchanger is brought in contact with or eluted, respectively, with an aqueous solution having a set concentration of heavy isotopes, the value or value salt containing the heavy isotope is transferred to the aqueous phase and the ion exchanger is regenerated.

32. Process as defined in claim 30, wherein, in order to separate the deuterized or tritiumized value or value salt with the acid cation exchanger, one or a plurality of adjuvants selected from the group of lithium salts which facilitate or improve the fixation of the value or value salt at the cation exchanger are added to the aqueous solution.

33. Process as defined in claim 32, wherein the adjuvants are one or a plurality of salts selected from the group lithium chloride, lithium nitrate, lithium sulfate, and lithium acetate.

34. Process as defined in claim 32, wherein the separated ion exchanger is brought in contact with or eluted, respectively, with an aqueous solution having a set concentration of heavy isotopes, the value or value salt containing the heavy isotope is transferred to the aqueous phase and the ion exchanger is regenerated.

35. Process as defined in claim 30, wherein the release of the deuterium oxide and/or of the tritium oxide from the value or value salt contained at the cation exchanger and separation of the deuterium oxide and/or of the tritium oxide from the value or value salt is effected by treatment with a base.

36. Process as defined in claim 35, wherein the base employed is a substance whose cation is not or only slightly complexed by the value or value salt.

37. Process as defined in claim 35, wherein the base employed is at least one material selected from a tetraalkyl ammonium hydroxide, an ammonium hydroxide of a cyclic amine, lithium hydroxide, lithium carbonate or cesium hydroxide.

38. Process as defined in claim 37, wherein the tetraalkyl ammonium hydroxide employed is one or a plurality of species selected from the group tetramethyl ammonium hydroxide, tetraethyl ammonium hydroxide, tetrapropyl ammonium hydroxide, tetra-n-butyl ammonium hydroxide, and tetra-t-butyl ammonium hydroxide.

39. Process as defined in claim 37, wherein the cyclic amine for the ammonium hydroxide of cyclic amine employed is one or a plurality of species selected from the group pyrrole, pyrrolidine, pyridin, benzopyrrole, and quinoline.

40. Process as defined in claim 35, wherein the base contains the heavy hydrogen isotope to be enriched in the same concentration as the value or value salt before its release.

41. Process as defined in claim 1, wherein the separation of the value or value salt is effected by precipitating the value or value salt from the protic solution with the aid of at least one precipitation substance whose anions form difficultly soluble salts or compounds with at least one value or value salt.

42. Process as defined in claim 41, wherein the precipitation substance employed is at least one species selected from the group tetraiodo bismuth acid (TIBA), perchloric acid, picric acid, hexafluorophosphoric acid, hexafluoroantimonic acid and tetrafluoroboric acid.

43. Process as defined in claim 1, wherein the release of the deuterium oxide and/or of the tritium oxide from the value or value salt or its protic solution is effected by treatment with a base.

44. Process as defined in claim 43, wherein the base employed is a substance whose cation is not or only slightly complexed by the value or value salt.

45. Process as defined in claim 42, wherein the base employed is at least one material selected from a tetraalkyl ammonium hydroxide, an ammonium hydroxide of a cyclic amine, lithium hydroxide, lithium carbonate or cesium hydroxide.

46. Process as defined in claim 45, wherein the tetraalkyl ammonium hydroxide employed is one or a plurality of species selected from the group tetramethyl ammonium hydroxide, tetraethyl ammonium hydroxide, tetrapropyl ammonium hydroxide, tetra-n-butyl ammonium hydroxide, and tetra-t-butyl ammonium hydroxide.

47. Process as defined in claim 45, wherein the cyclic amine for the ammonium hydroxide of cyclic amine employed is one or a plurality of species selected from the group pyrrole, pyrrolidine, pyridin, benzopyrrole, and quinoline.

48. Process as defined in claim 43, wherein the base contains the heavy hydrogen isotope is to be enriched in the same concentration as the value or value salt before its release.

* * * * *